United States Patent [19]

Adell

[11] 4,334,700
[45] Jun. 15, 1982

[54] DOOR EDGE GUARD

[75] Inventor: Robert Adell, Novi, Mich.

[73] Assignee: U.S. Product Development Co., Novi, Mich.

[21] Appl. No.: 118,475

[22] Filed: Feb. 4, 1980

[51] Int. Cl.³ .............................................. B60J 5/00
[52] U.S. Cl. ....................................... 280/770; 49/462
[58] Field of Search .................. 280/770, 762, 153 B, 280/814; 296/41, 84 D; 293/123, 128, 126; 52/716; 24/259 R, 259 FS; 16/DIG. 2; 49/462

[56] References Cited

U.S. PATENT DOCUMENTS

| | | | |
|---|---|---|---|
| 2,146,090 | 2/1939 | O'Rourke | 49/462 |
| 2,704,687 | 3/1955 | Adell | 49/462 |
| 2,919,032 | 12/1959 | Sinawski | 280/814 |
| 2,929,656 | 3/1960 | Adell | 49/462 |
| 3,222,838 | 12/1965 | Sweeney | 52/717 |
| 3,382,615 | 5/1968 | Adell | 49/462 |
| 3,383,823 | 5/1968 | Bond | 52/716 |
| 3,547,515 | 12/1970 | Shanok et al. | 49/462 |
| 3,706,173 | 12/1972 | Taylor | 49/462 |
| 4,259,812 | 4/1981 | Adell | 52/716 |
| 4,271,633 | 6/1981 | Adell | 52/716 |

Primary Examiner—David M. Mitchell
Attorney, Agent, or Firm—Olsen and Stephenson

[57] ABSTRACT

An ornamental and protective vehicle door edge guard comprises a metallic strip of generally U-shaped cross section which is self-retaining on the door. Disposed on either, or both, free longitudinal edges of the metallic strip is a non-metallic strip of generally U-shaped cross section which serves to protect the door paint from being scratched or marred when the edge guard is applied to the door. The non-metallic strip further serves to insulate the metallic strip from the metal of the door.

2 Claims, 5 Drawing Figures

DOOR EDGE GUARD

BACKGROUND AND SUMMARY OF THE INVENTION

This invention relates to ornamental and protective edge guards which are applied to the edges of sheet metal closures of an automotive vehicle, such as the vehicle's doors.

In a typical automotive vehicle, door edge guards are applied to the trailing edges of the vehicle's doors to protect the door edges from damage which might be caused by striking an object which may be present in a door's path when the door is opened. It is very desirable for such door edge guards to be made of bright metal, such as stainless steel, aluminum, or bimetal, due to the superior protective and ornamental characteristics of such materials. Furthermore, the inherent strength and resiliency of such metallic edge guards enable them to be self-retaining on the doors. Correspondingly, it is generally undesirable to use separate fasteners or adhesives in securing door edge guards to doors since they involve extra cost in labor and materials. It is also generally undesirable to use non-metallic edge guards, such as vinyl edge guards, since they do not possess the superior protective, ornamental, and self-retention characteristics of the bright metallic edge guards. In connection with the usage of self-retaining door edge guards, it has heretofore been recognized that the potential for paint scratching and marring exists when the metallic edge guards are applied to vehicle doors. Such paint scratching can lead to premature corrosion of the door edge metal. A principal cause of this potential problem is attributable to the rather substantial dimensional variation in the thickness of the marginal edge of the door to which the edge guard is applied. Such variation is inherent in the prevailing method of constructing vehicle doors. Thus, a self-retaining door edge guard must be capable of accommodating a rather large range of door edge thicknesses, yet it must not cause paint scratching or marring on the door, and furthermore it must be readily installable on the assembly line, and it must be economical. Some of applicant's own prior inventions have addressed the paint scratching problem and provided solutions. For example, see applicant's own U.S. Pat. No. 2,704,687 in which integral curls are formed at the extremities of the inner and outer legs of the edge guard.

The present invention provides a new and improved edge guard for the edges of vehicle body closures, such as vehicle doors, which embodies the desirable characteristics of being metallic and self-retaining, which requires no separate fasteners or adhesives for attachment to a door, which avoids the potential problem of paint scratching and marring, which can accommodate the variations in door edge thickness, and yet which achieves economy in labor and use of materials. An edge guard embodying principles of the present invention can be readily installed on an automobile on an assembly line with a conventional tool and without the use of special tools, machines, or other devices. The present invention permits the use of metallic door edge guards of simple U-shape cross section, which means that a minimum amount of metal need be used. Prior edge guards, such as that disclosed in applicant's above-mentioned patent, require extra metal because of the integrally formed curls at the extremities of the inner and outer legs. Furthermore, fabrication of a metallic edge guard with curls is somewhat more complicated than fabrication of one without curls. The present invention possesses the further advantage of protectively insulating the edge guard metal from the door metal, and this is important in minimizing any tendency for electrochemical action to occur between the two when dissimilar metals are involved.

The foregoing features, advantages, and benefits of the present invention, along with additional ones, will be seen in the ensuing description and claims which should be considered in conjunction with the accompanying drawings. The drawings disclose presently preferred embodiments of the present invention, and the disclosure sets forth the best mode presently contemplated for carrying out the invention.

DESCRIPTION OF THE PREFERRED EMBODIMENTS

Figure 1:
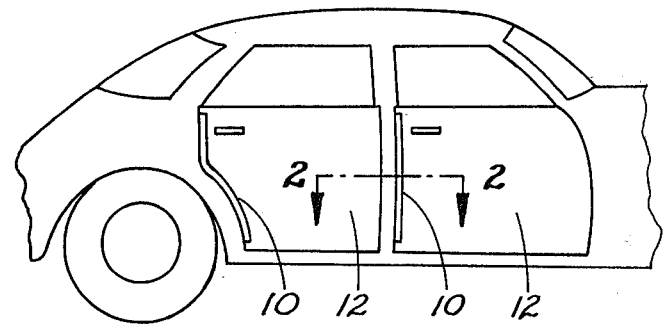
FIG. 1 is a fragmentary side elevational view of an automobile body showing edge guards on the doors in accordance with principles of the present invention.
Figure 2:
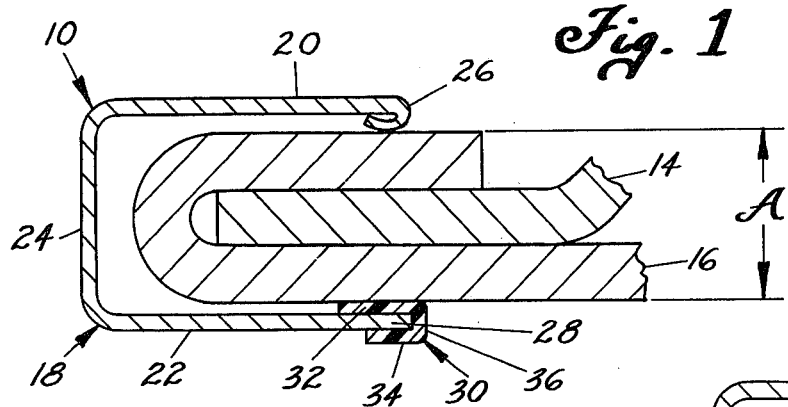
FIG. 2 is a fragmentary sectional view, on an enlarged scale, taken in the direction of arrows 2—2 in FIG. 1.

FIG. 1 illustrates an ornamental and protective edge guard 10 embodying principles of the present invention applied to each of the doors 12 of an automobile. The shape of each edge guard corresponds to the shape of the trailing edge of the corresponding door to which it is applied, as can be seen in FIG. 1. The illustrated edge guards are shown to be coextensive in length with the trailing edges of the doors; however, they may be shorter, depending upon the specific requirements for a given model of automobile. As can be seen in FIG. 2, the typical door edge to which a door edge guard is applied includes an inner sheet metal door panel 14 around the free edge of which is folded the peripheral margin of an outer sheet metal door panel 16. For various reasons involved in the prevailing manufacture of vehicle doors, the thickness of the door edge, as represented by the letter A in FIG. 2, is subject to substantial variation in dimension. A satisfactory door edge guard must be capable of accommodating such substantial variations, which by way of example may range from about 0.110 inch to about 0.160 inch.

A first embodiment of door edge guard 10 embodying the present invention is shown in FIG. 2 installed on the edge of one of the vehicle doors 12. The edge guard comprises a metallic strip 18 of generally U-shaped cross section having an inner leg 20, an outer leg 22, and a bottom 24 joining the two legs. The extremity, or free end, of the inner leg is formed with a bend 26 while the free end 28 of the outer leg is essentially straight. A non-metallic strip 30 of generally U-shaped cross section is disposed on the free end 28 of the outer leg and comprises an inner leg 32, an outer leg 34, and a bottom 36 joining the two legs 32, 34. Plastics are suitable materials for strip 30, and vinyl, or PVC, may be used to advantage. Vinyl may be conveniently extruded to the desired cross sectional shape and strips may be cut to desired lengths. The vinyl strips are reasonably conformable to any bends in the metallic strip 18 which may be required to match the contour of the trailing edge of a door. The spacing between the inner and outer legs 32, 34 of the non-metallic strip is made essentially equal to the thickness of the material of the metallic strip 18. Although it might be possible for the non-metallic strip 30 to be self-retaining on the metallic strip 18, it is deemed preferable to apply some adhesive between the two preparatory to assembling them together to form the edge guard.

One of the primary purposes of the non-metallic strip is to avoid scratching and chipping of paint from the door edge when the edge guard is applied to the door. Because the door edge guard is to be self-retaining on the door, the dimension across the open end of the edge guard before installation on the door must be such that the edge guard will flex upon application to the door so that the resiliency of the edge guard will provide the self-retention force. Thus, the door edge guard dimensions must be targeted to fit on a minimum thickness door edge. Because of the substantial dimensional variations in door edge thickness, as explained above, some door edge guards will encounter much greater flexing than others. Therefore, it can now be appreciated that the softer non-metallic strip serves to protect the paint on the door from being chipped, marred, or scratched by the metallic strip. The physical characteristics of the non-metallic strip material contribute to the self-retention characteristics of the edge guard.

Another purpose served by the non-metallic strip is to further insulate the metallic strip 18 from the door. This is particularly important where the metal of the strip is different from the sheet metal of the door. Otherwise, if such dissimilar metals are not effectively insulated from each other, electrochemical action can occur, resulting in premature corrosion. In view of the current efforts of automobile manufacturers toward improved corrosion protection, this is a definitely desirable attribute of the present invention.

In the specific embodiment of FIG. 2, a protective non-metallic strip is applied only to the outer leg 22. The inner leg 20 is formed with bead 26 which presents a smooth rounded contour bearing against the door edge. It is believed that such an arrangement can be acceptable in certain situations. If not, a non-metallic strip can be provided on each leg, and the cross sectional shapes of the non-metallic strips may be different to fit on different shapes of the free ends of the legs. (The subsequent FIGS. will show examples of different shapes.) An advantage of the FIG. 2 embodiment in the case of the outer leg is that the free end of the outer leg can be essentially straight. It does not have any formed bead or curl, and this means that less material is required and that fabrication is less complicated. It will be appreciated that dimensions of the strips will depend upon specific requirements for a given door design. Also in FIG. 2 the specific cross sectional shape of the illustrated non-metallic strip 30 is seen to have the outer leg 34 somewhat shorter than the inner leg 32. The reason for doing this is to keep exposed to view as much of the bright metal as possible. The free edge of the outer leg 34 is shaped to present to an observer a clean, trim appearance and to enhance the beauty of the bright metal. Indeed, the non-metallic strip may be considered aesthetically pleasing in contemporary automobile designs, which incorporate vinyl inserts in such trim and hardware items as body moldings, bumpers, and the like. By making the strip 30 of vinyl, it may be fabricated in any of a variety of colors. Automotive designers and stylists are thereby offered more versatility in their designs. Hence, not only does the invention provide the functional advantages described earlier, but it also affords additional ancillary benefits.

Figure 3:
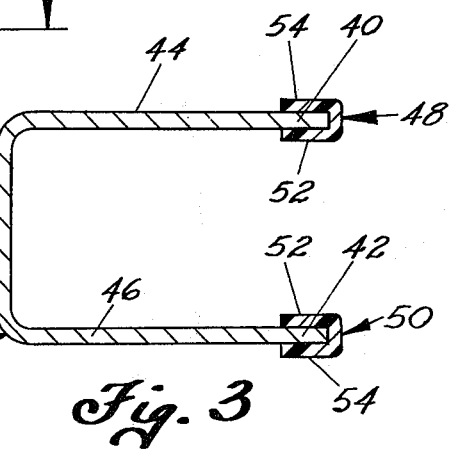
FIG. 3 is a view similar to FIG. 2, with portions omitted, of another embodiment of edge guard in accordance with the present invention.

FIG. 3 shows a further embodiment of edge guard 38 wherein the free edges 40, 42 of the inner and outer legs 44, 46 are essentially straight. Identical non-metallic strips 48, 50 are applied to the free edges of the legs in the same manner as the non-metallic strip 30 of FIG. 2 was applied to the metallic strip 18. The inner and outer legs 52, 54 of the two strips 48, 50 are identical in length.

Figure 4:
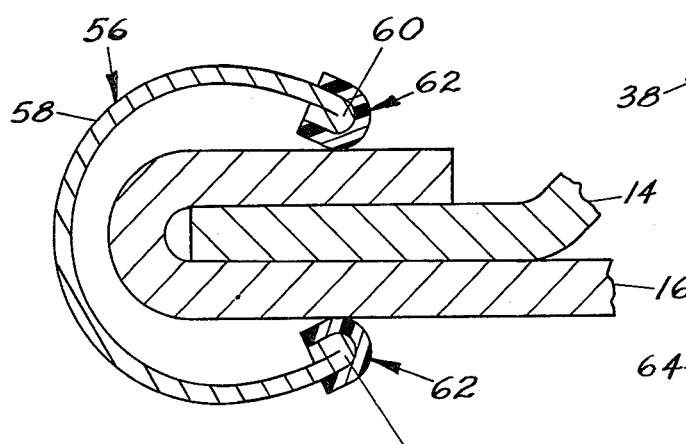
FIG. 4 is a view similar to FIG. 2 of still another embodiment of edge guard in accordance with the present invention.

FIG. 4 shows a still further embodiment of edge guard 56 wherein the metallic strip 58, while still of generally U-shaped cross section, is somewhat more rounded than the metallic strips of FIGS. 2 and 3. Inwardly turned beads 60 are fashioned on the free edges of the legs of the metallic strip 58, and U-shaped non-metallic strips are disposed over the beads. The non-metallic strips 62 are of a more rounded cross section than the non-metallic strips of FIGS. 2 and 3.

Figure 5:
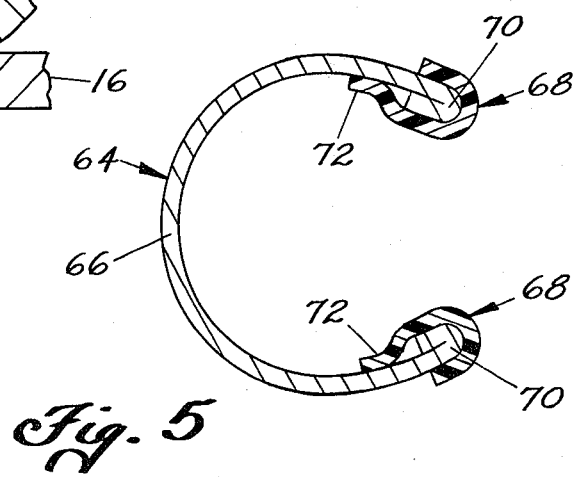
FIG. 5 is a view similar to FIG. 4, with portions omitted, of yet another embodiment of edge guard in accordance with the present invention.

FIG. 5 illustrates yet another embodiment of edge guard 64 which comprises a metallic strip 66 like the strip 58 of FIG. 4, but with differently shaped non-metallic strips 68 disposed on beads 70. Strips 68 differ from the strips 62 of FIG. 4 in that the strips 68 further include integral interlocking portions 72 which interlock behind beads 70 when the strips 68 are applied to the metallic strip 66. The interlocking portions 72 assist in retaining the non-metallic strips on the metallic strip and can eliminate the usage of adhesive in securing the non-metallic strips to the metallic strip.

In view of the foregoing description, it can be seen that the present invention provides a basic new and improved edge guard construction which is susceptible of embodiment in any of a variety of specific configurations as required for individual vehicle models. The invention exhibits the desirable characteristics of using the resiliency of the metallic strip for self-retention when installed on a vehicle and hence requiring no separate fasteners or adhesive for installation, of being of economical in construction, of avoiding paint scraping and chipping when applied to a vehicle, of accommodating variations in door edge thickness, and of being readily installable on a vehicle on the assembly line by use of a conventional tool, such as a rubber mallet. While specific preferred embodiments of the invention have been disclosed herein, the scope of the invention is defined by the following claims.

What I claim as my invention is:

1. For installation of the marginal edge of a sheet metal closure of a vehicle body, such as a door, a self-retaining ornamental and protective edge guard comprising a metallic strip of generally U-shaped cross section having inner and outer legs which are adapted to be disposed on opposite sides of and exert a retention force on said marginal edge and including the improvement which comprises a strip of non-metallic insulating material and of generally U-shaped cross section disposed on the free edge of one of said legs of said metallic edge guard strip along at least a portion of the length thereof and providing an insulating layer separating said portion from contact with said closure when said metallic edge guard strip is applied to said closure wherein said free edge of said one leg includes an integral turned bead adapted to bear against the corresponding side of said marginal edge when said metallic edge guard strip is applied to said closure, said non-metallic strip is disposed over said bead and includes an integral interlocking portion which interlocks behind the far end edge of the bead to secure the non-metallic strip to said one leg.

2. For installation on the marginal edge of a sheet metal closure of a vehicle body, such as a door, a self-retaining ornamental and protective edge guard comprising a metallic strip of generally U-shaped cross section having inner and outer legs which are adapted to be disposed on opposite sides of and exert a retention force on said marginal edge wherein the free edge of one leg includes an integral turned bead adapted to bear against the corresponding side of said marginal edge when said metallic edge guard strip is applied to said closure, and including the improvement which comprises non-metallic insulating material disposed on said free edge of said one leg along at least a portion of the length thereof and providing an insulating layer separating said portion from contact with said closure when said metallic edge guard strip is applied to said closure, said non-metallic insulating material fitting over the free edge of said one leg on both sides of said bead and including on one side thereof an integral portion which extends over and beyond the far end edge of the bead and against said one leg.

* * * * *